United States Patent Office 2,801,160
Patented July 30, 1957

2,801,160

METHOD OF INDUCING PLANT RESPONSE EFFECTS

Hyman Iserson, Erdenheim, Pa., assignor to Pennsalt Chemicals Corporation, a corporation of Pennsylvania No Drawing. Application November 17, 1955,
Serial No. 547,566

11 Claims. (Cl. 71—2.7)

This invention relates to a method of inducing plant response effects which comprises treating plants with certain acetylenic diols and their esters.

The plant physiological activity of plant hormones or growth-regulating chemicals is manifested in several different types of external modifications, among which are cell elongation (which is commonly measured by applying a chemical to one side of an Avena coleoptile and measuring the amount of bending induced by the differential cell elongation), formative effects involving modification of leaves (usually narrow and parallel-veined), formation of galls, or enlargements on the stem. Epinasty or bending of leaves or stems downwardly usually accompanies this effect. Growth inhibition occurs with a more limited number of plant hormones and results in a stunted plant which does not die. Killing of plants or toxic effects occurs with certain hormones as in the case of the widely used 2,4-dichlorophenoxyacetic acid.

The occurrence of different types of plant repsonses varies with the species of plant and the kind and amount of chemical growth regulator employed. Plant responses of importance include defoliation, weed killing and other effects, in general involving marked stimulation, retardation or other modification of normal plant processes.

In accordance with the present invention, it has been found that an acetylenic diol of the structure $$HOCH_2(—C\equiv C—)_nCH_2OH$$

where $n$ equals 1 or 2, and esters thereof, are very effective agents for inducing plant response effects and particularly that of defoliation. These compounds are particularly useful in the defoliation of castor beans, soy beans, nursery stock and fruit trees.

Many compounds which are structurally related to acetylenic diols of the above structure and their esters have been tested for plant response effects and none has been found which produces plant responses as does acetylenic diols of the above structure and their esters.

The acetylenic diol may be applied in dust or liquid form. The liquid form will generally be a water solution since the compounds are soluble in water. When the compound is applied as a dust, it may be mixed with certain adjuvants such as finely divided clays and similar materials such as talc, fuller's earth, diatomaceous earth, gypsum, kaolin, and silica gel. A mixture of 30% by weight 2-butyne-1,4-diol and attaclay, for example, prepared by mixing a water solution of the active compound with clay and evaporating the water, produced excellent defoliation of bean plants when applied to the plants at a rate of 12 to 18 pounds of dust per acre.

The esters of these acetylenic diols, such as 2-butyne-1,4-diol diacetate, dipropionate, and dibutyrate, and the corresponding esters of hexadiyne-1,6-diol, are insoluble in water and may be applied to plants either as dusts or emulsions in water. When the esters are applied as dusts, they may be mixed with inert extenders such as talc, fuller's earth, diatomaceous earth, finely divided clays and the like. When applied as emulsions the esters may be dissolved in an organic solvent such as ether or acetone and this solution may be emulsified in water using any of the well known emulsifying agents commonly used for this purpose, such as alkyl aryl sulfonates and the like. The term adjuvant, as used herein, includes such agents or any other additive contributing to the usefulness of the material for plant response effects.

The active compound may be applied to plants at rates ranging from about 1 to about 10 pounds or more of active ingredient per acre, depending upon the plant upon which it is used. It has also been found that moisture is desirable for defoliant action to be effected. Therefore, the active compound should be applied as a water solution, emulsion, or as a dust under conditions of high humidity in order to obtain maximum activity. It has been found that treatment of cotton plants with from 2 to 6 pounds per acre of the acetylenic diol in water solution produced excellent defoliation.

The pH of the solution of the acetylenic diol which is applied to plants is important for obtaining maximum defoliation. A pH within the range of about 4 to 10 is preferred and the water solution which is applied to the plant is preferably a buffered pH system. The active compound is an effective defoliant in both the alkaline and acid pH ranges but has been found to be particularly effective in the preferred pH range.

The invention will be further illustrated by reference to the following specific examples:

*Example 1*

A series of tests was performed to determine the defoliant action of acetylenic diols of the above structure and compounds structurally related to it. In these tests, water solutions were made of those compounds which are water soluble and water emulsions made of those which are water insoluble. These emulsions or solutions were applied at the percentage by weight concentration indicated below to cotton plants and the percentage defoliation at the end of five days was observed. The solution or emulsion in each case was sprayed on the plants until excess solution or emulsion started to run off of the leaves. The results are as follows:

| Compound | Percent Concentration | Percent Defoliation |
| --- | --- | --- |
| 2-Butyne-1,4-diol | 0.2 | 87 |
| 2,4-Hexadiyne-1,6-diol | 0.2 | 100 |
| Ethylene Glycol | 1.0 | 0 |
| Propylene glycol | 1.0 | 3 |
| Dipropylene glycol | 1.0 | 21 |
| Triethylene glycol | 1.0 | 6 |
| Polyethylene glycol | 1.0 | 13 |
| 2-Methyl-3-butynol-2 | 0.2 | 0 |
| 3-Methyl-1-pentynol-3 | 0.2 | 0 |
| 1,3-Butanediol | 0.2 | 0 |
| | 1.0 | 0 |
| 1,5-Pentanediol | 0.2 | 0 |
| | 1.0 | 0 |
| Tetrahydrofuran | 0.2 | 0 |
| | 1.0 | 29 |
| Propargyl alcohol | 0.2 | 13 |
| 2,5-Diphenyl-3-hexyne-2,5-diol | 0.2 | 0 |
| | 1.0 | 10 |
| 1,4-Butanediol | 0.2 | 0 |
| | 1.0 | 0 |
| 3-Butyne-1-ol | 0.2 | 0 |
| | 1.0 | 0 |
| 3,6-Dimethyl-4-octyne-3,6-diol | 0.2 | 20 |
| | 1.0 | 30 |

From the foregoing it will be seen that none of the compounds tested of structure other than $$HOCH_2(—C\equiv C—)_nCH_2OH$$

many of which were closely related structurally to 2-butyne-1,4-diol ($HOCH_2C\equiv CCH_2OH$) and 2,4-hexadiyne-1,6-diol, ($HOCH_2C\equiv C—C\equiv CCH_2OH$) produced the unexpectedly high percentage of defoliation produced by these compounds.

Example 2

To illustrate the effectiveness of esters of butyne diol, an emulsion of 2-butyne-1,4-dioldiacetate was prepared containing the equivalent of 0.5% by weight of 2-butyne-1,4-diol. This emulsion was applied to cotton plants in accordance with the procedure of Example 1. At the end of five days, 62% defoliation was observed.

Example 3

A series of tests was performed to determine the effect of pH of a water solution of 2-butyne-1,4-diol on defoliant activity. In these tests a 0.1% by weight solution of 2-butyne-1,4-diol was used with a buffered pH system, buffered with citric acid and disodium phosphate, in all cases listed below except that where pH=10 in which sodium carbonate only was used.

The solutions were sprayed on cotton plants until the solutions began to run off the leaves. The results are as follows:

| pH of Solution Applied | Percent Defoliation |
|---|---|
| (unadjusted) 6 | 55 |
| adjusted to: | |
| 2 | 48 |
| 4 | 62 |
| 6 | 59 |
| 8 | 100 |
| 10 | 79 |

In the foregoing it is seen that a pH of about 8 produces the most complete defoliation and that a neutral or alkaline solution, in general, is more effective than an acidic solution.

The reference in the claims to the rate of application being a stated number of pounds per acre is indicated to define also the rate when only one or a few plants are treated as in nursery work, the rate per plant being capable of calculation from the acre rate by assuming a normal spacing of such plants in an acre of planting.

It will be obvious to those skilled in the art that many modifications may be made within the scope of the present invention without departing from the spirit thereof and the invention is to be restricted only in accordance with the disclosure.

This application is a continuation-in-part of my copending application Serial No. 331,734 filed January 16, 1953, now abandoned.

I claim:

1. The method of defoliating plants which comprises contacting the plant, in an amount sufficient to cause defoliation, with a compound selected from the group consisting of an acetylenic diol of the structure $$HOCH_2(-C\equiv C-)_n CH_2OH$$

where $n$ is an integer not greater than 2, and esters thereof.

2. The method of claim 1 in which the compound is applied in admixture with an inert extender.

3. The method of claim 1 in which the compound is applied at a rate ranging from about 1 to about 10 pounds per acre calculated on a field of plants spaced at normal intervals.

4. The method of claim 3 in which the compound is applied in solution form.

5. The method of claim 4 in which the pH of the solution is between about 4 and 10.

6. The method of claim 1 in which the compound is 2-butyne-1,4-diol.

7. The method of claim 1 in which the compound is an ester of 2-butyne-1,4-diol.

8. The method of claim 1 in which the compound is 2,4-hexadiyne-1,6-diol.

9. The method of claim 1 in which the compound is an ester of 2,4-hexadiyne-1,6-diol.

10. The method of claim 5 in which the compound is 2-butyne-1,4-diol.

11. The method of claim 5 in which the compound is an ester of 2-butyne-1,4-diol.

No references cited.